United States Patent [19]
Jones

[11] Patent Number: 4,939,847
[45] Date of Patent: Jul. 10, 1990

[54] TRUE POSITION GAUGE

[75] Inventor: Gerald M. Jones, Titusville, Pa.

[73] Assignee: GTE Products Corporation, Stamford, Conn.

[21] Appl. No.: 308,067

[22] Filed: Feb. 9, 1989

[51] Int. Cl.[5] ........................ G01B 21/16; G01B 11/14

[52] U.S. Cl. ........................................ 33/545; 33/613; 33/533; 33/645

[58] Field of Search .................. 33/613, 545, 533, 645

[56] References Cited

U.S. PATENT DOCUMENTS 4,052,793 10/1977 Coughlin et al. ..................... 33/645
4,280,279 7/1981 Grundfest ............................ 33/613

OTHER PUBLICATIONS

Keyence FS/FU series, "Optical-Fiber Photoelectric Sensors", Keyence catalog, No. FFS-KA-01 (no date).

*Primary Examiner*—William A. Cuchlinski, Jr.
*Assistant Examiner*—Diego F. F. Gutierrez
*Attorney, Agent, or Firm*—Willaim H. McNeill

[57] ABSTRACT

A true position gauge for checking the alignment of a plurality of electrical contacts positioned in an electrical connector, said contacts extending from the connector body and presenting a patterned array, said gauge comprising: a gauge work station; connector receiving means at said work station; connector alignment means at said work station for cooperating with said connector to present a consistent alignment to said gauge; a gauge plate at said work station, said gauge plate containing a plurality of apertures equal in number and pattern to said patterned contact array; gauge plate moving means operable to deposit said gauge plate upon said connector; and sensing means operable in conjunction with said deposit of said gauge to determine if said contacts have penetrated said apertures.

4 Claims, 2 Drawing Sheets

TRUE POSITION GAUGE

TECHNICAL FIELD

This invention relates to electrical connectors having a plurality of electrical contacts and more particularly to a position gauge for determining the correct alignment of the plurality of contacts during manufacture.

BACKGROUND ART

As the number of contacts in electrical connectors increases it becomes increasingly difficult for alignment of the contacts to be checked visually by an inspector or by use of hand held mechanical gauging, these prior art techniques being expensive and lacking in consistency.

DISCLOSURE OF THE INVENTION

It is, therefore, an object of the invention to obviate the disadvantages of the prior art.

It is another object of the invention to enhance electrical connector consistency.

Yet another object of the invention is the provision of apparatus for gauging multiple contacts in a consistent manner.

These objects are accomplished, in one aspect of the invention, by the provision of a true position gauge for checking the alignment of a plurality of electrical contacts positioned in an electrical connector, said contacts extending from the connector body and presenting a patterned array, said gauge comprising: a gauge work station; connector receiving means at said work station; connector alignment means at said work station for cooperating with said connector to present a consistent alignment to said gauge; a gauge plate at said work station, said gauge plate containing a plurality of apertures equal in number and pattern to said patterned contact array; gauge plate moving means operable to deposit said gauge plate upon said connector; and sensing means operable in conjunction with said deposit of said gauge to determine if said contacts have penetrated said apertures.

This gauge removes the problems encountered by prior art devices and greatly improves consistency.

BEST MODE FOR CARRYING OUT THE INVENTION

For a better understanding of the present invention, together with other and further objects, advantages and capabilities thereof, reference is made to the following disclosure and appended claims taken in conjunction with the above-described drawings.

Figure 1:
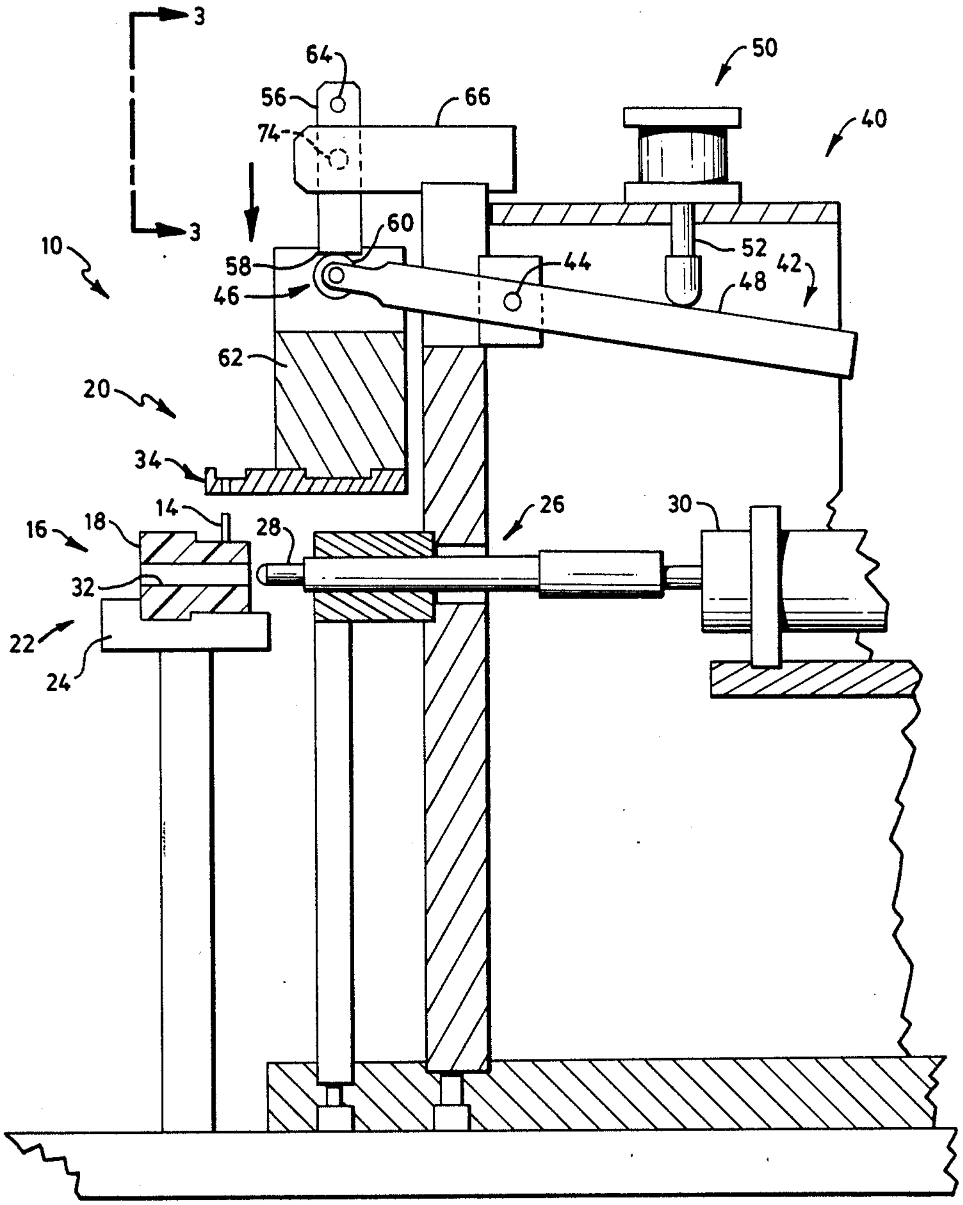
FIG. 1 is an elevational view, partially in section, of the apparatus of the invention.

Referring now to the drawings with greater particularity, there is shown in FIG. 1 a true position gauge 10 for checking the alignment of a plurality of contacts 14, only one of which is shown, in an electrical connector 16. The contacts 14 extend from the connector body 18 and present a patterned array, linear in the instant case, although this is exemplary only.

The gauge comprises a gauge work station 20 having connector receiving means 22 which can be a block 24 formed to embrace the connector configuration. Connector alignment means 26 is provided adjacent the connector receiving means to insure consistent positioning of the connector. In the illustrated embodiment the alignment means 26 comprises a probe 28 mounted for transverse movement by a fluid motor 30. The probe 28, upon actuation of the fluid motor 30, engages and penetrates an aperture 32 which is present in connector body 18. In the event the connector being worked upon has no convenient aperture, it is preferred that some other consistent feature of the connector body be employed as the aligning point.

Figure 2:
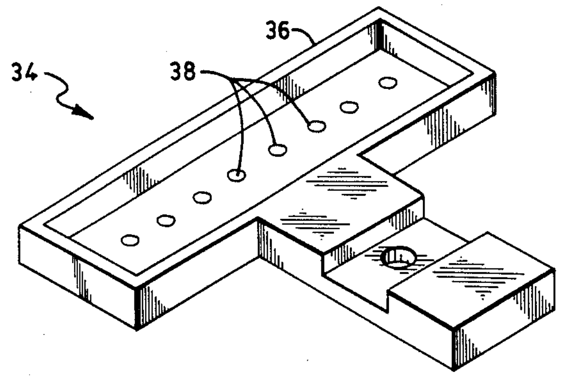
FIG. 2 is a Perspective view of a gauge plate which can be used with the invention.

A gauge plate 34 (see FIG. 2) is provided at the work station 20 and comprises a substantially rectangular unit 36 containing a plurality of apertures 38 equal in number and pattern to the patterned contact array. The diameter of the apertures 38 is just larger than the diameter of the contacts 14 so they may fit thereover.

The gauge plate 34 is moved into and out of operable position with the contacts 14 by gauge plate moving means 40. The moving means 40 comprises a counter-balanced arm 42, pivoted at 44, carrying gauge plate 34 at one end 46 thereof. The opposite end 48 cooperates with a fluid motor 50 whose shaft 52 acts upon opposite end 48 to maintain the gauge in a normally raised position. Retraction of shaft 52 allows the counter-balanced arm 42 and its associated gauge plate 34 to descend and engage a connector 16.

Sensing means 54, in the embodiment shown, comprises a journeled slide 56 having a contact portion 58 which rides upon the connecting point 60 where arm 42 joins the gauge plate mounting block 62. The journeled slide 56, being freely fitted, descends when the gauge Plate 34 descends.

Figure 3:
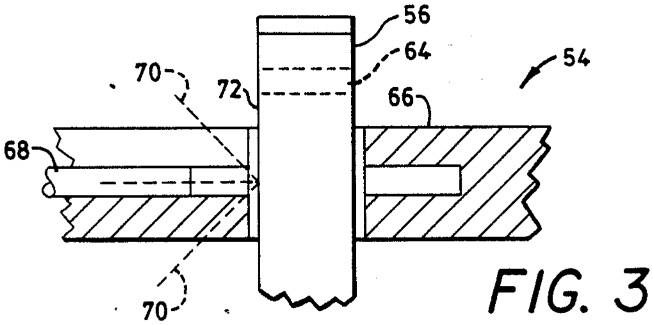
FIG. 3 is a partial view illustrating a sensing system in a reject mode.
Figure 4:
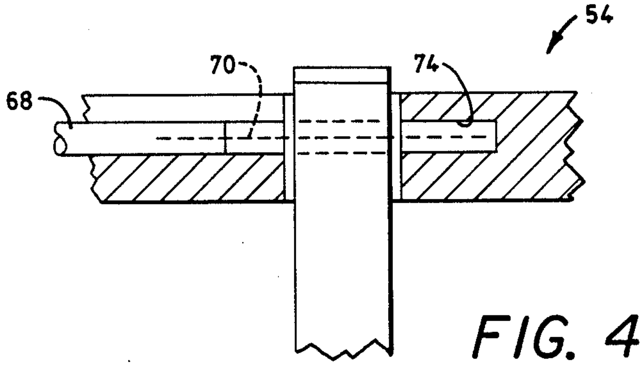
FIG. 4 is similar view illustrating the system in a pass mode.

The sensing means 54 further comprises a depth signalling aperture 64 in slide 56. Operation of the sensing means 54 is illustrated in FIGS. 3 and 4. FIG. 3 illustrates, in partial section, the fixed support 66 for the journeled slide 56. The support is provided with a fiber optic cable 68 which transmits a light beam 70 which is normally reflected from a side wall 72 of slide 56. When shaft 52 is retracted, allowing gauge plate 34 and slide 56 to descend, and assuming no bent contacts, gauge plate 34 will accept and surround all of the contacts 14 via its apertures 38 and descend to its lowest possible level. At that position the depth signalling aperture 64 is in alignment with fiber optic cable 68 allowing the light beam 70 to penetrate therethrough and into bore 74 wherein the beam 70 is absorbed. This absorbtion signals that the connector has passed, since no bent contacts are present. If a bent contact is present, the gauge plate 34 will not fully descend, the light will not enter the bore 74, and the connector will be rejected.

It is to be noted that this true position gauge, by virtue of its method of operation, will not detect missing contacts 14. Accordingly, use of this device should be in conjunction with a contact sensor, such for example, as a contact continuity tester which is shown in U.S. Ser. No. 07/308065, filed concurrently herewith, by the same inventor and assigned to the same assignee.

While there have been shown what are at present considered to be the preferred embodiments of the invention, it will be apparent to those skilled in the art that various changes and modifications can be made herein without departing from the scope of the invention as defined by the appended claims.

I claim:

1. A true position gauge for checking the alignment of a plurality of electrical contacts positioned in an electrical connector, said contacts extending from the connector body and presenting a patterned array, said gauge comprising: a gauge work station; connector receiving means at said work station; connector alignment means at said work station for cooperating with said connector to present a consistent alignment to said gauge; a gauge plate at said work station, said gauge plate containing a plurality of apertures equal in number and pattern to said patterned contact array; gauge plate moving means operable to deposit said gauge plate upon said connector; and sensing means operable in conjunction with said deposit of said gauge to determine if said contacts have penetrated said apertures.

2. The true position gauge of claim 1 wherein said gauge plate moving means comprises; a pivoted, counter-balanced arm carrying said gauge plate at one end thereof; the opposite end thereof cooperating with fluid motor means; said fluid motor means having a shaft acting upon said opposite end of said arm to maintain said gauge plate in a normally raised position.

3. The true position gauge of claim 2 wherein said sensing means comprises a journeled slide having a contact portion which rides upon the connecting point where said counter-balance arm joins the gauge plate mounting block; said journeled slide descending when said gauge plate descends and including a depth signalling aperture.

4. The sensing means of claim 3 wherein a fixed support for said journeled slide includes a fiber optic cable which comes into alignment with said signalling aperture in said slide when said slide and said gauge plate descend to said connector and no mis-aligned contact interferes with said descent.

* * * * *